United States Patent Office 2,715,749
Patented Aug. 23, 1955

2,715,749

METHOD OF TREATING VEAL

Kenneth M. Coughenour, La Grange, Ill., assignor to Swift & Company, Chicago, Ill., a corporation of Illinois No Drawing. Application January 12, 1953,
Serial No. 330,906

6 Claims. (Cl. 17—45)

The present invention relates in general to an improved method of treating calves for the production of high-grade veal therefrom. More particularly, the present invention relates to a method for treating calves whereby an improved appearance is presented by the resulting veal carcass.

It has been found desirable in connection with the preparation of veal carcasses to utilize a so-called "cold skinning" method wherein the carcasses are chilled to about 34°–36° F. and held for about 48 hours prior to skinning. Contrary to the skinning of heavier beef carcasses, or the like, an improved appearance of a veal carcass is obtained by leaving the hide on the carcass during evisceration of the carcass, and subsequently removing the hide after the carcass has been chilled. However, this method presents certain disadvantages which have tended to make its practice questionably acceptable. By removing the hide after the visceral cavity is opened, there is a greater opportunity for contamination of the meat through bacteria contained in the hide. Also, it has been found that "cold skinning" of a veal carcass leaves numerous fine hairs on the chilled carcass which must be thoroughly removed before the carcass may be shipped in interstate commerce. The removal of these hairs requires the use of hand blow torches and mechanical scrapers resulting in a substantial labor cost and time consumption. Additionally, veal carcasses prepared in the conventional manner and "cold skinned" have exhibited a dry texture and a relatively undesirable color.

It is therefore an object of the present invention to provide a method for treating veal carcasses which overcomes the disadvantages heretofore associated with "cold skinning."

Another object of the present invention is to provide a method for improving the color of "cold skinned" veal carcasses.

An additional object of the present invention is to provide a method for obviating the necessity of hand removal of fine hairs from "cold skinned" veal carcasses.

Additional objects, if not specifically set forth herein, will be readily apparent to one skilled in the art from the following detailed description of the invention.

Generally, the present invention contemplates the subjection of unskinned veal carcasses, fresh from the killing floor, to treatment with a hot fluid bath under controlled conditions of time and temperature.

More particularly, the present invention comprises subjecting hot, unskinned veal carcasses to the action of a hot fluid bath maintained at a temperature of from about 130° to about 140° F. for a period of time ranging from about 5 to about 40 minutes. It has been found that, by this procedure, it is possible to loosen the hair on the hide of the veal carcass to such an extent that the carcass may thereafter be satisfactorily dehaired in a conventional hog dehairing apparatus. By so doing, it has been found that the resulting carcass, when so skinned, no longer possesses a plurality of fine hairs which have heretofore created a problem in the use of the so-called "cold skinning" method.

Moreover, it has been found that by controlling the time of treatment and the temperature of the bath within the limits specified, the resulting veal carcass after chilling and cold skinning possesses a highly improved color and texture. The treated carcasses should be chilled after treatment to a temperature of 34°–36° F. by holding in a cooler for 24–48 hours prior to skinning for best results.

The following specific example is furnished for the purpose of illustration only and is not to be construed as placing any limitation on the appended claims:

Example

A calf was killed on the killing floor and immediately, while still hot and prior to any evisceration, immersed in a water bath held at 137° F. for seven minutes. The internal temperature of the carcass at the end of this treatment was between 105° and 108° F. as contrasted with 100° F. at the time of killing. The carcass was then passed through a Boss Dehairer wherein it was subjected to the action of a series of beaters under a stream of water. The beaters removed the hair loosened by the prior treatment and the water washed this hair to the base of the machine. Upon removal from the machine, substantially all of the fine hairs normally present on the hide were found to have been satisfactorily removed. Chilling to 34° F. and skinning after 48 hours of chill disclosed a fine and attractive pink color of the meat, representing an improvement in color over that obtained by conventional methods of handling veal carcasses.

The treatment of calves in the manner hereinbefore described permits the development of an improved color in the veal carcasses, results in a cleaner carcass which is more acceptable to the Meat Inspection Bureau of the Department of Agriculture, results in a hide more acceptable to the tanner, and eliminates a substantial amount of labor heretofore necessary in cleaning hair from the skinned carcasses.

While the method of the present application has been described in conjunction with a hot water bath in which the unskinned and uneviscerated carcass is immersed, it is also possible to achieve the desirable results of hair removal and improved color by treating the veal carcasses with a hot water spray or a steam bath. The temperature and time conditions are essentially the same, although in the case of steam, slightly higher temperatures up to about 170° F. may be used without deleterious results, provided the time of treatment is not extended beyond about 40 minutes as specified above.

Obviously many modifications and variations of the invention as hereinbefore set forth may be made without departing from the spirit and scope thereof, and therefore only such limitations should be imposed as are indicated in the appended claims.

I claim:

1. A method of treating veal carcasses which comprises: subjecting freshly slaughtered, unskinned veal carcasses to the action of a fluid bath maintained at a temperature of from about 130° to about 140° F. for a period of time ranging from about 5 to 40 minutes; removing the carcasses from said bath and subjecting them to a mechanical dehairing operation.

2. In a method for improving the appearance of veal carcasses, the improvement which comprises: subjecting freshly slaughtered, unskinned veal carcasses to the action of a hot fluid bath maintained at a temperature of from about 130° to about 140° F. for a period of time from about 5 to 40 minutes.

3. A method of treating veal carcasses which comprises: immersing freshly slaughtered, unskinned veal carcasses in a fluid bath maintained at a temperature of about 140° F. for at least five minutes to loosen the hair sufficiently for clean removal; removing said carcasses from said bath; dehairing said carcasses and chilling the resulting dehaired carcasses.

4. A process for the treatment of veal carcasses prior to "cold skinning" which comprises: immersing freshly slaughtered veal carcasses in a fluid bath maintained at a temperature of from about 130° to 140° F. for a period of from about 5 to 40 minutes; removing the carcasses from said bath; subjecting said carcasses to a mechanical dehairing operation; and thereafter chilling the dehaired carcasses.

5. A method of treating veal carcasses which comprises: subjecting freshly slaughtered, unskinned veal carcasses to immersion in a water bath maintained at a temperature of from about 130° to about 140° F. for a period of time ranging from about 5 to 40 minutes; removing the carcasses from said bath and subjecting them to a mechanical dehairing operation.

6. A method of dehairing veal carcasses which comprises: immersing freshly slaughtered, unskinned veal carcasses in a water bath maintained at a temperature of about 140° F. for at least five minutes to loosen the hair sufficiently for clean removal; removing said carcasses from said bath; dehairing said carcasses; and chilling the resulting dehaired carcasses.

References Cited in the file of this patent

UNITED STATES PATENTS

| | | |
|---|---|---|
| 2,020,846 | McKee et al. | Nov. 12, 1935 |
| 2,084,857 | McKee et al. | June 22, 1937 |
| 2,100,299 | Tobin | Nov. 23, 1937 |